United States Patent
Lei et al.

(10) Patent No.: US 11,781,042 B2
(45) Date of Patent: Oct. 10, 2023

(54) ADHESIVE SHEET

(71) Applicant: TERAOKA SEISAKUSHO CO., LTD., Tokyo (JP)

(72) Inventors: Ming Lei, Tokyo (JP); Shohei Ogino, Tokyo (JP); Kazuki Ohishi, Tokyo (JP); Eryu Sasaki, Tokyo (JP)

(73) Assignee: TERAOKA SEISAKUSHO CO., LTD., Tokyo (JP)

( * ) Notice: Subject to any disclaimer, the term of this patent is extended or adjusted under 35 U.S.C. 154(b) by 0 days.

(21) Appl. No.: 16/637,711

(22) PCT Filed: Aug. 10, 2017

(86) PCT No.: PCT/JP2017/029187
§ 371 (c)(1),
(2) Date: Feb. 7, 2020

(87) PCT Pub. No.: WO2019/030914
PCT Pub. Date: Feb. 14, 2019

(65) Prior Publication Data
US 2020/0181458 A1    Jun. 11, 2020

(51) Int. Cl.
*C09J 7/30* (2018.01)
*C09J 163/00* (2006.01)

(52) U.S. Cl.
CPC ............... *C09J 7/30* (2018.01); *C09J 163/00* (2013.01); *C09J 2400/24* (2013.01); *C09J 2463/00* (2013.01)

(58) Field of Classification Search
None
See application file for complete search history.

(56) References Cited

U.S. PATENT DOCUMENTS

| 2007/0141328 A1 | 6/2007 | Kamiyama |
| 2010/0215955 A1* | 8/2010 | Kishioka ............. B32B 27/06 428/355 AC |
| 2012/0237764 A1* | 9/2012 | Soejima ............... C09J 133/02 428/343 |

(Continued)

FOREIGN PATENT DOCUMENTS

| CN | 101740353 A | 6/2010 |
| CN | 102592503 A | 7/2012 |

(Continued)

OTHER PUBLICATIONS

Lei, M. et al., Adhesive Sheet, Oct. 13, 2016, machine translation of WO2016163514 (Year: 2016).*

(Continued)

*Primary Examiner* — Chinessa T. Golden
(74) *Attorney, Agent, or Firm* — Law Office of Katsuhiro Arai

(57) ABSTRACT

Disclosed is an adhesive sheet having an adhesive layer 2 on at least a part of one side or both sides of a base 1, characterized in that a protective layer 3 is provided on at least a part of the surface of the adhesive layer 2. The adhesive layer 2 is preferably an expandable adhesive layer, and the protective layer 3 is preferably a hot-melt protective layer. The protective layer 3 may contain a functional component such as an antistatic agent, a coloring agent, a hard coating agent, a lubricant, a heat dissipating material, a metal deactivator and an antioxidant. This adhesive sheet can protect an adhesion surface and does not cause blocking and skin disorders even if a release liner is not used, and is also excellent in various functions.

5 Claims, 2 Drawing Sheets

(56) References Cited

U.S. PATENT DOCUMENTS

| | | | |
|---|---|---|---|
| 2013/0004749 A1* | 1/2013 | Hao .................. | B32B 3/085 |
| | | | 428/201 |
| 2015/0174865 A1* | 6/2015 | Hatanaka ............ | B32B 7/12 |
| | | | 428/141 |
| 2016/0120068 A1* | 4/2016 | Tien ................... | B32B 9/007 |
| | | | 428/138 |
| 2016/0160092 A1 | 6/2016 | Awkal et al. | |
| 2016/0326403 A1 | 11/2016 | Yoneyama et al. | |
| 2016/0340555 A1 | 11/2016 | Ueki | |
| 2017/0267897 A1 | 9/2017 | Yamamoto et al. | |
| 2018/0134926 A1 | 5/2018 | Lei et al. | |

FOREIGN PATENT DOCUMENTS

| | | | |
|---|---|---|---|
| CN | 105637007 A | 6/2016 | |
| CN | 105940071 A | 9/2016 | |
| CN | 106414640 A | 2/2017 | |
| JP | H0860108 A | 3/1996 | |
| JP | H10237982 A | 9/1998 | |
| JP | 2002012834 A | 1/2002 | |
| JP | 2003053904 A | 2/2003 | |
| JP | 2007106963 A | 4/2007 | |
| JP | 2007522957 A | 8/2007 | |
| JP | 2008133349 A | 6/2008 | |
| JP | 2008280436 A | 11/2008 | |
| JP | 2011213875 A | 10/2011 | |
| JP | 2012007130 A | 1/2012 | |
| JP | 2012051994 A | 3/2012 | |
| JP | 2013131593 A | 7/2013 | |
| JP | 2014167099 A | 9/2014 | |
| JP | 2016108532 A | 6/2016 | |
| JP | 2017019993 A | 1/2017 | |
| JP | 2017052198 A | 3/2017 | |
| TW | 200528269 A | 9/2005 | |
| TW | 201540806 A | 11/2015 | |
| TW | 201614033 A | 4/2016 | |
| TW | 201641635 A | 12/2016 | |
| WO | 2014119426 A1 | 8/2014 | |
| WO | 2015115570 A1 | 8/2015 | |
| WO | 2015194389 A1 | 12/2015 | |
| WO | 2016084947 A1 | 6/2016 | |
| WO | 2016109199 A1 | 7/2016 | |
| WO | 2016163514 A1 | 10/2016 | |
| WO | WO-2016163514 A1 * | 10/2016 | ............. B32B 27/38 |

OTHER PUBLICATIONS

International Search Report (ISR) dated Sep. 12, 2017, issued for International application No. PCT/JP2017/029187. (2 pages).

A Decision to Grant a Patent issued by the Japanese Patent Office dated Jun. 14, 2022, for divisional application (2020-171117) of Japanese counterpart application No. 2019-535553 (3 pages).
A Decision to Grant a Patent issued by the Japanese Patent Office dated Sep. 15, 2020, for Japanese counterpart application No. 2019-535553. (3 pages).
A First Office Action issued by the State Intellectual Property Office of China dated Aug. 3, 2021, for Chinese counterpart application No. 201780093758.6 (9 pages).
A Notice of Final Rejection issued by Korean Intellectual Property Office dated Jul. 26, 2022, for Korean counterpart application No. 10-2020-7004136 (3 pages).
A Notice of Reasons for Refusal issued by the Japanese Patent Office dated Dec. 7, 2021, for divisional application (2020-171117) of Japanese counterpart application No. 2019-535553. (7 pages).
A Notification of Examination Opinions with Search Report issued by Taiwan Intellectual Property Office dated Jul. 25, 2022, for Taiwan counterpart application No. 107127832 (7 pages).
A Request for the Submission of an Opinion issued by Korean Intellectual Property Office dated Jan. 23, 2022, for Korean counterpart application No. 10-2020-7004136 (3 pages).
A Second Office Action issued by the State Intellectual Property Office of China dated Mar. 23, 2022, for Chinese counterpart application No. 201780093758.6 (8 pages).
A Third Office Action issued by the State Intellectual Property Office of China dated Mar. 3, 2023, for Chinese counterpart application No. 201780093758.6 (8 pages).
A Written Decision on Registration issued by Korean Intellectual Property Office dated Jan. 11, 2023, for Korean counterpart application No. 10-2020-7004136 (2 pages).
Extended European Search Report (EESR) dated Jul. 28, 2020, issued for European counterpart patent application No. EP17921174.3 (14 pages).
International Preliminary Report on Patentability, dated Feb. 11, 2020, for corresponding international application PCT/JP2017/029187 (1 page).
Notification Concerning Transmittal of International Preliminary Report on Patentability, dated Feb. 20, 2020, for corresponding international application PCT/JP2017/029187 (1 page).
Written Opinion of the International Searching Authority, dated Dec. 9, 2017, for corresponding international application PCT/JP2017/029187 (5 pages).
An Office Action issued by Taiwan Intellectual Property Office, dated Apr. 14, 2023, for Taiwan counterpart application No. 107127832. (10 pages).

* cited by examiner

ADHESIVE SHEET

TECHNICAL FIELD

The present invention relates to an adhesive sheet having a protective layer on the surface of an adhesive layer.

BACKGROUND ART

Adhesive sheets are used for fixing parts and members in fields such as the electric and electronic field, the automobile related field and the civil engineering and construction field. The adhesive sheet is provided with a layer of an adhesive agent such as an epoxy-based or acrylic-based one having high adhesiveness in order to realize strong adhesion to an adherend.

Adhesive sheets before use are required to protect the surface (adhesion surface) of an adhesive layer from foreign matter, dust, scratches and deterioration, in order to prevent a decrease in the adhesion strength. Also, in order to prevent unintentional adhesion to an unintended location (so-called blocking) and to prevent contamination of the operator's hand, protection of the adhesion surface is said to be indispensable.

Patent Document 1 discloses a thermosetting adhesive tape or sheet provided with a release liner in order to make it difficult for foreign substances such as dust and dirt to adhere to the surface of the thermosetting adhesive layer. Patent Document 2 discloses an invention that facilitates handling by providing a liner made of a resin film on the adhesion surface of an adhesive sheet for fixing electric components.

However, for an adhesive tape or sheet having a release liner, it is necessary to introduce equipment having a liner winding mechanism in an automatic process of continuously assembling members. Further, since the unnecessary release liner becomes dust, it is not preferable from the viewpoint of global environmental protection.

On the other hand, Patent Document 3 discloses a technique in which an inorganic filler is contained in an adhesive layer in order to improve the blocking resistance of the adhesive layer. Further, Patent Document 4 discloses a technique in which a second pressure-sensitive adhesive layer containing a plurality of fine particles is provided on a first pressure-sensitive adhesive layer to make a release sheet unnecessary.

However, although these inventions can prevent blocking and improve work efficiency without using a release liner, there is a concern that the adhesive may affect the skin. In particular, epoxy-based adhesives and acrylic-based adhesives are known to cause skin damage (Non-Patent Document 1), and even the inclusion of fine particles such as an inorganic filler in the adhesive layer cannot avoid such skin damage.

RELATED ART DOCUMENTS

Patent Document

Patent Document 1: JP 2012-51994
Patent Document 2: JP 2008-280436
Patent Document 3: JP H08-60108
Patent Document 4: JP 2017-19993

Non-Patent Document

Non-Patent Document 1: Edited by Three Bond Co., Ltd. "Three Bond Technical News No. 40" issued on Dec. 25, 1992

SUMMARY OF INVENTION

Technical Problem

The present invention has been made to solve the above-mentioned problems of the prior art. That is, an object of the present invention is to provide an adhesive sheet which can protect an adhesion surface and does not cause blocking or skin damage even if a release liner is not used.

Solution to Problem

The present inventors have conducted intensive studies to solve the above-mentioned object and resultantly found that it is very effective to provide a protective layer on at least a part of the surface of an adhesive layer, leading to completion of the present invention.

That is, the present invention relates to an adhesive sheet having an adhesive layer on at least a part of one or both sides of a base, characterized in that the adhesive sheet has a protective layer on at least a part of the surface of the adhesive layer.

Advantageous Effect of Invention

The adhesive sheet of the present invention can protect the adhesion surface and does not cause blocking or skin damage even without using a release liner. Further, by including substances having various functions such as, for example, an antistatic agent, a coloring agent, a hard coat agent, a lubricant, a heat dissipating material, a metal deactivator, an antioxidant and a flame retardant in the protective layer, various functions can be imparted to the adhesive sheet without impairing properties of the adhesive layer.

MODES FOR CARRYING OUT THE INVENTION

Figure 1:
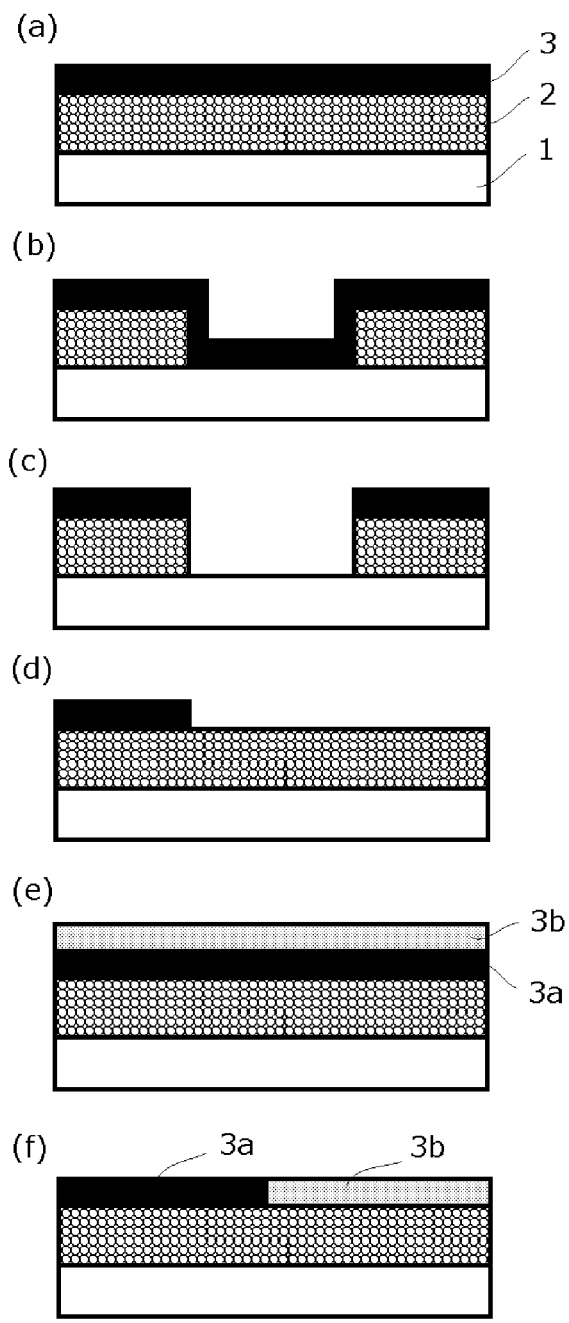
FIG. 1 is a schematic sectional view showing an embodiment of the adhesive sheet of the present invention.

FIG. 1 is a schematic sectional view showing one embodiment of the adhesive sheet of the present invention. In the embodiment shown in FIG. 1 (*a*), an adhesive layer 2 is provided on one entire surface of a base 1, and a protective layer 3 is provided on the entire surface of the adhesive layer 2. However, the present invention is not limited to this embodiment, and for example, the adhesive layers 2 may be provided on both sides of the base 1.

The adhesive layer 2 may be provided on a part of one or both sides of the base 1. In this case, as shown in FIG. 1 (*b*), the protective layer 3 may be provided so as to cover the entire surface of the adhesive layer 2 and the entire surface of the base on which the adhesive layer is not provided, or as shown in FIG. 1 (*c*), it may be provided so as to cover only the entire surface of the adhesive layer 2. Further, as shown in FIG. 1 (d), the protective layer 3 may be provided on a part of the surface of the adhesive layer 2.

The protective layer 3 may contain functional components such as an antistatic agent, a coloring agent, a hard coat agent, a lubricant, a heat dissipating material, a metal deactivator, an antioxidant, a flame retardant, a water/oil repellent and a solvent resistant resin which will be described in detail later. Thereby, a desired function other than protection can be imparted to the protective layer 3. Further, the adhesive layer 2 may also contain functional components which are the same as or different from those in the protective layer 3.

Two types of the protective layer 3 can be provided. For example, as shown in FIG. 1(e), a protective layer having a two-layered structure in which, on the surface of the protective layer 3a provided on the adhesive layer 2, another protective layer 3b is further provided may be permissible. The protective layer 3 having such a two-layered structure may be formed by additionally coating the protective layer 3b on the protective layer 3a, or may be formed by separating in the coating process. Further, the protective layer may have a three or more-layered structure. Further, as shown in FIG. 1 (f), the protective layer 3a and the protective layer 3b may be provided at different positions on the surface of the adhesive layer 2, respectively. The protective layer 3a and the protective layer 3b are, for example, layers containing functional components different from each other. Thereby, two different functions can be given to the entire surface (FIG. 1 (e)), or two different functions can be given to different positions (FIG. 1 (f)).

Hereinafter, each configuration of the adhesive sheet of the present invention will be described.

[Base 1]

The base 1 used in the present invention is a member for supporting the adhesive layer 2 as shown in FIG. 1.

The base 1 is not particularly limited, but is preferably a heat-resistant insulating base. Although the level of heat resistance varies depending on the application to be used, for example, the melting temperature of the base 1 is preferably 200° C. or higher, more preferably 250° C. or higher. Further, for example, the continuous use temperature of the base 1 measured in accordance with UL-746B is preferably 100° C. or higher, more preferably 150° C. or higher.

The base 1 may be a single-layered base composed of one member as shown in FIG. 1 or a base composed of a laminate having a laminated structure in which one member and another member are pasted with a bonding adhesive for lamination. The base 1 may have flexibility or may have resilience, and its properties are appropriately selected depending on the application. In applications where the stiffness and shape retention capacity of the adhesive sheet are required, the base 1 is preferably a base composed of a laminate.

The member constituting the base 1 is preferably a resin film, a nonwoven fabric or paper, and more preferably a resin film. When the base is a base composed of a laminate, the member is preferably at least one member selected from the group consisting of a resin film, a nonwoven fabric and paper, and at least one is preferably a resin film.

Specific examples of the resin film includes polyester type resins such as polyethylene terephthalate (PET), polybutylene terephthalate, polyethylene naphthalate (PEN) and aromatic polyester; polycarbonates; polyarylates; polyurethanes; polyamide type resins such as polyamide and polyether amide; polyimide type resins such as polyimide, polyether imide and polyamideimide; polysulfone type resins such as polysulfone and polyether sulfone; polyether ketone type resins such as polyether ketone and polyether ether ketone; polyphenylene sulfide (PPS); and modified polyphenylene oxide. Two or more resin films may be used in combination. Among them, polyphenylene sulfide (PPS), polyethylene naphthalate (PEN), polyimide and polyether ether ketone are preferred.

The base 1 may be subjected to a corona treatment or a primer treatment in order to improve the adhesion with the adhesive layer 2.

The thickness of the base 1 may be appropriately selected depending on the intended use. Generally, it is 2 to 200 μm, preferably 9 to 100 μm, more preferably 12 to 50 μm.

[Adhesive Layer 2]

As shown in FIG. 1, the adhesive layer 2 used in the present invention is provided on at least a part of one or both sides of a base.

The type of the adhesive layer 2 is not particularly limited, but is preferably a thermosetting adhesive layer containing a thermosetting resin, a curing agent and a curing catalyst, more preferably an expansion adhesive layer containing a temperature-sensitive foaming agent, particularly preferably a foamable epoxy adhesive layer in which the thermosetting resin is an epoxy resin.

The epoxy resin preferably contains a polyfunctional epoxy resin. Although the type of the polyfunctional epoxy resin is not limited, novolak-type epoxy resins such as a phenol novolak type and a cresol novolak type, and a mixture thereof are preferable. When a novolak-type epoxy resin is used, the glass transition temperature of the cured product becomes high, so that the adhesive force tends to be stable even at high temperatures.

As the epoxy resin, epoxy resins other than the polyfunctional epoxy resin may be used in combination. By use of the polyfunctional epoxy resin and other epoxy resins in admixture, the physical properties such as softening temperature, melt viscosity, glass transition temperature and storage elastic modulus of the epoxy resin can be controlled easily and in detail. In general, when an epoxy resin of low softening temperature or in liquid state is mixed, flowability in heating and flexibility before and after curing, of the adhesive layer can be enhanced. In contrast, when an epoxy resin of high softening temperature or in semi-solid or solid state is mixed, tackiness of the surface of the adhesive layer can be decreased. Further, the liquid epoxy resin can also be used for the purpose of pre-dispersing components such as a thermally expandable microcapsule in power or grain state contained in the temperature-sensitive foaming agent, or for the purpose of uniformly mixing components of the epoxy resin.

Specific examples of the epoxy resin which can be mixed as described above include bisphenol type epoxy resins such as a bisphenol A type, a dimer acid-modified bisphenol A type and a bisphenol F type; epoxy resins having an aliphatic skeleton such as hexane diol diglycidyl ether; phenoxy resins (polyhydroxy polyethers synthesized from bisphenols and epichlorohydrin); and crystalline epoxy resins. The crystalline epoxy resin is non-tacky solid at normal temperature, while acts as a reactive diluent at melting temperature or more since melt viscosity lowers significantly at melting temperature or more. For this reason, when the crystalline epoxy resin is contained in the adhesive layer 2, flowability in heating of the adhesive layer 2 can be more enhanced, acting advantageously on thermal expansion of the adhesive layer 2. Since it is non-tacky solid at room temperature, it is useful for reducing stickiness of the surface of the adhesive layer, or for rendering the surface of the adhesive layer non-sticky. When the adhesive layer 2 is formed by a melt coating method, the melt viscosity of the epoxy resin can be lowered to enhance the speed of melt coating, by heating at temperatures not lower than the melting temperature of the crystalline epoxy resin.

The number-average molecular weight of the epoxy resin is generally 100 to 60000 in terms of standard polystyrene by GPC. The epoxy equivalent of the epoxy resin is generally 50 to 30000 g/eq.

The curing agent used for the adhesive layer 2 is not particularly limited, but when an epoxy resin is used, a phenol resin is preferable. When a phenol resin is used as a curing agent and used in combination with an imidazole-based compound as a curing catalyst described later, the curing time can be reduced and the heat resistance can be improved. In addition, the use of a phenol resin as a curing agent facilitates design of heat resistance and electric characteristics. The addition amount of the phenol resin is theoretically determined so that the number of hydroxyl equivalents of the phenol resin relative to the number of epoxy equivalents of the epoxy resin is about 1:1. The ratio of the number of hydroxyl equivalents of the phenolic resin to the number of epoxy equivalents of the epoxy resin is usually 0.5 to 2.0, preferably 0.8 to 1.2.

The curing catalyst used for the adhesive layer 2 is not particularly limited, but when a phenol resin is used as the curing agent, an imidazole compound is preferable. When an imidazole compound is used as a curing catalyst and used in combination with a phenol resin as a curing agent, the curing time is shortened and the heat resistance is improved. In addition, the imidazole-based compound has the advantage that it can be used as a single catalyst and has a very fine particle size grade as compared with other curing catalysts, so that it is easy to use.

Specific examples of the imidazole-based compound include imidazole derivatives such as 2-phenyl-4,5-dihydroxymethylimidazole, 2-phenyl-4-methylimidazole, 2-ethyl-4-methylimidazole, 2,4-diethylimidazole and 2-phenyl-4-methyl-5-hydroxyimidazole. Two or more imidazole-based compounds may be used in combination. Among them, 2-phenyl-4,5-dihydroxymethylimidazole is preferable. The content of the imidazole-based compound is preferably 0.1 to 1.0 part by mass, more preferably 0.3 to 0.8 parts by mass with respect to 100 parts by mass of resin components in the adhesive layer.

The temperature-sensitive foaming agent used in the adhesive layer 2 includes, for example, inorganic foaming agents such as ammonium carbonate, ammonium hydrogen carbonate, ammonium nitrite, ammonium borohydride and azides; organic foaming agents such as alkane fluorides such as trichloromonofluoromethane, azo compounds such as azobisisobutyronitrile, hydrazine compounds such as p-toluene sulfonyl hydrazide, semi-carbazide compounds such as p-toluene sulfonyl semi-carbazide, triazole compounds such as 5-morpholyl-1,2,3,4-thiatriazole, and N-nitroso compounds such as N,N-dinitrosoterephthalamide; thermally expandable microcapsules obtained by microcapsulating a thermal expansion agent composed of a hydrocarbon compound. Two or more temperature-sensitive foaming agents may be used in combination. When an epoxy resin is used, thermally expandable microcapsules are preferable from the standpoint of no inhibition of curing of the epoxy resin and reduction of adverse effects exerted on physical properties of the epoxy resin.

The thermally expandable microcapsule is a microcapsule having a thermoplastic resin having a gas barrier property as a shell and enclosing a thermal expansion agent inside the shell. When the thermally expandable microcapsule is heated, the thermoplastic resin as a shell softens and the volume of the thermal expansion agent increases, thereby expanding the capsule. For example, vaporization of a hydrocarbon compound having low boiling point can be utilized for expansion of the capsule.

The expansion (foaming) temperature of the thermally expandable microcapsule is preferably not less than the softening temperature of the epoxy resin and not more than the activation temperature of the curing reaction of the epoxy resin. When this foaming temperature is not less than the softening temperature of the epoxy resin, the thermal expansion agent can be expanded sufficiently in the softened epoxy resin and the thickness of the expandable adhesive layer 2 after foaming can be made uniform. When this foaming temperature is not more than the activation temperature of the curing reaction of the epoxy resin, curing of an epoxy resin before foaming can be prevented. Further, when melt or solution coating is contained in the production process of the adhesive sheet, gelling of an epoxy resin during these coating steps and an accompanying drying step can be prevented, by adjusting the softening temperature of an epoxy resin to be not more than the activation temperature of the curing reaction.

The softening temperature of an epoxy resin can be measured using a ring and ball softening temperature test method prescribed in JIS K 2207. The foaming temperature of the thermally expandable microcapsule is a temperature at which volume variation of the thermally expandable microcapsule occurs, and it can be selected, for example, from a range of 70° C. or more and 200° C. or less, preferably 100° C. or more and 180° C. or less.

The content and the volume expansion modulus of the temperature-sensitive foaming agent can be appropriately determined according to, for example, the strength and the adhesive force required for the cured adhesive layer 2 and the expansion modulus required for the adhesive sheet. The content of the temperature-sensitive foaming agent is preferably 0.5 to 20 parts by mass, more preferably 2 to 15 parts by mass with respect to 100 parts by mass of resin components in the adhesive layer 2. The increase factor of the thickness of the adhesive sheet after foaming can be, for example, 1.1 times or more and 10 times or less.

It is preferable that other resins (heat resistant resin) are added to the adhesive layer 2 from the standpoint of close adhesion to the base 1, flexibility when bending the adhesive sheet, a leveling property in coating an adhesive and prevention of liquid drip in conducting heating, foaming and curing. Specific examples the other resins include a polyester resin, a butyral resin, a urethane resin, a carboxyl group-terminated butadiene nitrile rubber (CTBN) and epoxy-modified butadiene. Among them, a urethane resin is most preferable from the standpoint of flexibility and adhesiveness.

The urethane resin is, in general, a resin containing a soft segment composed of a polyol monomer unit and a hard segment composed of a polyfunctional isocyanate compound or a low molecular glycol monomer unit. The polyol used in the urethane resin is a compound having two or more hydroxyl groups. The number of a hydroxyl group of the polyol is preferably 2 to 3, more preferably 2 from the standpoint of enhancing properties such as rubber elasticity elongation recovery rate. As the polyol, for example, polyester polyol, polyether polyol, polycaprolactone polyol, polycarbonate polyol and castor oil-based polyol can be used. Two or more polyols may be used in combination.

As the polyfunctional isocyanate compound used as the cross-linking agent for crosslinking a polyol, for example, polyfunctional aliphatic isocyanate compounds, polyfunctional alicyclic isocyanate compounds, and polyfunctional aromatic isocyanate compounds can be used. Further, trimethylolpropane adducts of these compounds, a biuret body reacted with water, and a trimer having an isocyanurate ring can also be used. Two or more polyfunctional isocyanate compounds may be used in combination.

Specific examples of the polyfunctional aliphatic isocyanate compound include trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate and 2,4,4-trimethylhexamethylene diisocyanate.

Specific examples of the polyfunctional alicyclic isocyanate compound include 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate and hydrogenated tetramethylxylylene diisocyanate.

Specific examples of the polyfunctional aromatic diisocyanate compound include phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate and xylylene diisocyanate.

The urethane resin is obtained by curing a composition containing the polyol and the polyfunctional isocyanate compound explained above. Particularly, low crystallinity linear polyester type polyurethane resins are preferable, and hexanediol copolyester type polyurethane resins and polytetramethylene glycol type polyurethane resins are more preferable, from the standpoint of properties such as rubber elastic elongation recovery rate.

The content of the urethane resin is preferably 60 parts by mass or less in 100 parts by mass of resin components in the adhesive layer 2.

It is preferable that the adhesive layer 2 contains a heat resistant filler from the standpoint of heat resistance and thermal conductivity. The kind of the heat resistant filler is not particularly restricted, and the heat resistant filler includes, for example, inorganic fillers such as aluminum oxide, magnesium oxide, calcium oxide, aluminum hydroxide, magnesium hydroxide, boron nitride, silicon nitride, silicon oxide and talc (magnesium silicate). Two or more heat resistant fillers may be used in combination. The content of the heat resistant filler is preferably 20 to 300 parts by mass, more preferably 20 to 100 parts by mass with respect to 100 parts by mass of resin components in the adhesive agent.

The adhesive layer 2 may contain additives such as antioxidants such as phenol type antioxidants and sulfur-based antioxidants, silane coupling agents such as epoxy-modified alkoxysilanes, thixotropic agents such as fumed silica, and pigments and dyes for identification, if necessary.

The adhesive layer 2 may be a continuous layer, or a discontinuous layer constituted of a plurality of patterns such as stripes and dots. Further, irregularities such as emboss may be formed on the surface of the adhesive layer 2. By making the adhesive layer 2 discontinuous or forming irregularities such as emboss on the surface of the adhesive layer 2, tackiness of the surface of the adhesive layer 2 can be decreased, or the adhesive force of the adhesive layer can be controlled, or the adhesive layer 2 can be formed only on the necessary portion. Since ununiformity of the surface of the adhesive layer 2 as described above is alleviated or annihilated in foaming, an adverse effect on adhesive force due to its ununiformity does not occur easily.

The thickness of the adhesive layer 2 may be appropriately determined depending on the intended use. Usually, it is 2 to 300 μm, preferably 2 to 150 μm.

[Protective Layer 3]

As shown in FIG. 1, the protective layer 3 used in the present invention is provided on at least a part of the surface of the adhesive layer. The protective layer 3 is preferably a layer that flows, decomposes or sublimates by heating when bonding the adhesive sheet, and, as a result, does not prevent the adhesive layer 2 from adhering to an adherend. In particular, it is more preferable that at normal temperature (the temperature at which the adhesive sheet is stored before use), the surface of the adhesive layer 2 is protected to prevent foreign matter, scratches and blocking, and at higher temperature (curing temperature of the adhesive sheet in use), the components constituting the protective layer 3 are dispersed and absorbed in the adhesive layer 2. For example, when the protective layer 3 is a hot-melt protective layer and the adhesive layer 2 is an expandable adhesive layer (an adhesive layer containing a temperature-sensitive foaming agent), microbubbles are generated in the expandable adhesive layer due to heating in bonding the adhesive sheet, and at the same time, the hot-melt protective layer flows, and the components constituting the protective layer diffuse into the adhesive layer under the influence of foaming. As a result, the hot-melt protective layer almost disappears from the surface of the adhesive layer, and the adhesive sheet adheres to an adherend without impairing the original adhesiveness of the adhesive agent.

The protective layer 3 is a part of a member constituting the adhesive sheet at the time of use, and for example, a release liner that is peeled at the time of use is not the protective layer 3.

When the protective layer 3 is a hot-melt protective layer, the type of the hot-melt substance contained in the protective layer 3 is not limited, and it may be a component which is a solid at normal temperature, and flows to the extent that at least it diffuses into the adhesive layer by heating when bonding the adhesive sheet (for example, a thermoplastic resin component). The glass transition temperature (Tg) of the hot-melt substance is preferably 100° C. or lower, the melting temperature thereof is preferably 200° C. or lower, and the softening temperature thereof is preferably 180° C. or lower.

By allowing the protective layer 3 to contain a functional component, it is also possible to impart a desired function other than protection to the protective layer 3. The hot-melt substance itself may be a functional component, or a functional component may be blended with the hot-melt substance. Specific examples of the functional component include an antistatic agent, a coloring agent, a hard coat agent, a lubricant, a heat dissipating material, a metal deactivator, an antioxidant, a flame retardant, a water/oil repellent, and a solvent resistant resin. When the functional component is a hot-melt substance, it is preferable that the functional component flows by heating when bonding the adhesive sheet and diffuses into the adhesive layer. On the other hand, when the functional component is not a hot-melt substance, it is preferable to include a hot-melt binder together with the functional component.

When the protective layer 3 contains an antistatic agent, an antistatic property can be imparted to the adhesive sheet. For example, sparks due to static electricity in the adhesive sheet manufacturing process (during feeding and transporting) can be suppressed, and defective peeling during feeding of the adhesive sheet can be prevented. The type of the antistatic agent is not particularly limited, and a commercially available product may be used.

When the protective layer 3 contains a coloring agent, the adhesive sheet can be given distinctiveness by coloring. Specifically, for example, it is possible to prevent an incorrect installation of the adhesive sheet having different configurations or adhesives on both sides. The type of the coloring agent is not particularly limited, and a commercially available product may be used.

When the protective layer 3 contains a hard coat agent, scratch resistance can be imparted to the adhesive sheet. Specifically, for example, when a small component is fixed to a predetermined portion inside a recent portable electronic device, it is possible to prevent the adhesive sheet from hitting another component and lowering the insulation. The type of the hard coat agent is not particularly limited, and a commercially available product may be used. Alternatively, printing may be performed on the protective layer 3 containing a hard coat agent by a method such as gravure printing containing a coloring agent. Such a method can be used, for example, when it is desired to display information (Lot or notice) of the adhesive sheet on the adhesive sheet.

When the protective layer 3 contains a lubricant, the adhesive sheet can be provided with slipperiness. Specifically, for example, the frictional resistance when arranging the adhesive sheet inside the portable electronic device can be reduced, and the adhesive sheet can be easily arranged even in a complex and intricate place. The type of the lubricant is not particularly limited, and a commercially available product may be used.

When the protective layer 3 contains a heat dissipating material, the adhesive sheet can be provided with thermal conductivity. The heat dissipating material is preferably used together with the binder resin. After the binder resin melts and disappears, the heat dissipating material stays in the vicinity of the surface of the adhesive layer, so that the thermal conductivity of the surface layer of the adhesive sheet can be particularly improved. As a result, for example, even if the surface of the adherend has uneven temperature, the adhesive layer can be foamed and cured uniformly. The type of the heat dissipating material is not particularly limited, and a commercially available product may be used.

When the protective layer 3 contains a metal deactivator, it is possible to prevent the adherend (metal) from deteriorating the adhesive layer of the adhesive sheet. The type of the metal deactivator is not particularly limited, and a commercially available product may be used.

When the protective layer 3 contains an antioxidant, oxidative deterioration of the adhesive sheet can be prevented. The type of the antioxidant is not particularly limited, and a commercially available product may be used.

When the protective layer 3 contains a flame retardant, flame retardancy can be imparted to the adhesive sheet. The type of the flame retardant is not particularly limited, and a commercially available product may be used.

When the protective layer 3 contains a water/oil repellent, the adhesive sheet can be provided with waterproof and oil-proof properties. Specifically, for example, it is possible to prevent adhesion of foreign matters including water and oil during the manufacturing process of the adhesive sheet, and prevent occurrence of defective products. The type of the water/oil repellent is not particularly limited, and a commercially available product may be used.

When the protective layer 3 contains a solvent-resistant resin, solvent resistance can be imparted to the adhesive sheet. The type of the solvent-resistant resin is not particularly limited, and a commercially available product may be used.

The thickness of the protective layer 3 is generally 0.01 to 30 µm, preferably 0.03 to 20 µm, and more preferably 0.05 to 15 µm.

[Adhesive Sheet]

The adhesive sheet of the present invention is an adhesive sheet having the protective layer 3 described above, and more specifically, the adhesive sheet has the adhesive layer 2 on at least a part of one side or both sides of the base 1, and has the protective layer 3 on at least a part of the surface of the adhesive layer 2. The adhesive sheet of the present invention does not require a release liner. However, for example, in the case of a double-sided adhesive sheet, the protective layer 3 may be provided on one adhesive layer, and the release liner may be provided on the other adhesive layer 2.

When the adhesive layer 2 contains a temperature-sensitive foaming agent, the adhesive sheet of the present invention preferably has a thickness before foaming and curing of 10 to 1000 µm, more preferably 10 to 250 µm, and particularly preferably 20 to 200 µm.

The method for producing the adhesive sheet of the present invention is not particularly limited. In the case of a single-sided adhesive sheet, it can be manufactured by forming the adhesive layer 2 on one surface of the base 1 and then forming the protective layer 3 on the surface of the adhesive layer 2. The adhesive layer 2 can be formed by a conventionally known method such as a solution coating method, a melt coating method, a melt extrusion method, and a rolling method. The melt coating method can be performed without a solvent, and does not require a solvent removing step and processing equipment, and is therefore preferable in terms of productivity and economy. When the melt coating method is used, the epoxy resin preferably contains a crystalline epoxy resin. In this case, by heating at temperatures not lower than the melting temperature of the crystalline epoxy resin, the melt viscosity of the epoxy resin can be reduced, and the speed of melt coating can be increased. For the protective layer 3, a known coating method may be appropriately used depending on the type of the material.

EXAMPLES

The present invention will be further illustrated by examples below, but the present invention is not limited to them.

<Expandable Adhesive Agent>

The following components were mixed in amounts shown in Table 1 (parts by mass), to obtain an expandable adhesive agent.

[Epoxy Resin]

"EP1": epoxy resin (semisolid, melt viscosity of butylcarbitol 60% solution is 220 to 300 mPa·s (25° C.), epoxy equivalent 180 g/eq, novolak, general type)

"EP2": epoxy resin (liquid, viscosity 13,000 mPa·s, epoxy equivalent 188 g/eq, general-purpose epoxy resin)

[Elastomer]

"E": linear polyester polyurethane (softening temperature 87° C., molecular weight 222300, hydroxyl group content 0.1%, adhesive and flexible type)

[Curing Agent, Catalyst]

"T1": phenol resin (softening temperature 110° C., hydroxyl group equivalent 97 g/eq, highly heat resistant type)

"T2": 2-phenyl-4,5-dihydroxymethylimidazole (manufactured by Shikoku Chemicals Corporation, trade name 2PHZ-PW, melting temperature 220° C., active region 141 to 153° C., initiation region 153 to 168° C.)

[Temperature-Sensitive Foaming Agent]

"H": temperature-sensitive foaming agent (average particle size 15 µm, expansion starting temperature 125 to 135° C., maximum expansion temperature 150 to 160° C.)

[Heat Resistant Filler]

"J1": magnesium oxide (average particle size 3 µm, thermally conductive, heat resistant and electrically insulating type)

"J2": magnesium silicate (average particle size 5 µm, thermally conductive, heat resistant and electrically insulating type)

TABLE 1

|  |  | Compounding 1 |
| --- | --- | --- |
| Epoxy resin | EP1 | 80 |
|  | EP2 | 20 |
| Elastomer | E | 34 |
| Curing agent, catalyst | T1 | 54 |
|  | T2 | 0.4 |
| Temperature-sensitive foaming agent | H | 6 |
| Heat resistant filler | J1 | 24 |
|  | J2 | 24 |

<Material for Protective Layer>

The following materials constituting each of protective layers were prepared.

"Compounding 2":

antistatic agent (manufactured by Chukyo Yushi Co., Ltd., trade name S-495, Tg 55° C.): 100 parts by mass "Compounding 3":

hard coating agent (manufactured by Goo Chemical Co., Ltd., trade name PLAS COAT Z-565, Tg 64° C., softening temperature 170 to 175° C.): 100 parts by mass dye (manufactured by Shachihata Inc., trade name Stampink S-1): 1 part by mass "Compounding 4":

hard coating agent (manufactured by Goo Chemical Co., Ltd., trade name PLAS COAT Z-565, Tg 64° C., softening temperature 170 to 175° C.): 100 parts by mass dye (manufactured by Shachihata Inc., trade name Stampink S-1): 1 part by mass "Compounding 5":

hard coating agent (manufactured by Goo Chemical Co., Ltd., trade name PLAS COAT Z-565, Tg 64° C., softening temperature 170 to 175° C.): 100 parts by mass "Compounding 6":

fluorine-based coating agent (manufactured by AGC SEIMI Chemical Co., Ltd., SF-Coat (registered trademark) SWK-601): 100 parts by mass "Compounding 7":

solvent resistant acryl emulsion (manufactured by Mitsui Chemicals, Inc., BONRON (registered trademark) XHS-50, Tg 60° C.): 100 parts by mass "Compounding 8":

heat dissipating material (manufactured by 3M, trade name Platelets006): 100 parts by mass linear polyester polyurethane (softening temperature 87° C., molecular weight 222300, hydroxyl group content 0.1%, adhesive and flexible type): 50 parts by mass "Compounding 9":

lubricant (manufactured by Chukyo Yushi Co., Ltd., trade name Rezem P677, melting temperature 80° C.): 100 parts by mass "Compounding 10":

flame retardant (manufactured by Otsuka Chemical Co., Ltd., trade name SPB-100, melting temperature 110° C.): 100 parts by mass linear polyester polyurethane (softening temperature 87° C., molecular weight 222300, hydroxyl group content 0.1%, adhesive and flexible type): 50 parts by mass Examples 1 to 10

The expandable adhesive agent of compounding 1 was applied to both sides of a base (PPS resin, manufactured by Toray Industries, Inc., TORELINA (registered trademark) #100-3030, 75 µm) so that the each thickness after drying was 50 µm, and thereafter, dried at 90° C. for 5 minutes to remove the solvent, forming an expandable adhesive layer. On the surface of the expandable adhesive layer, protective layers having the compoundings and thicknesses shown in Tables 2 and 3 were formed, to obtain adhesive sheets of Examples 1 to 10.

Comparative Example 1

An adhesive sheet was obtained in the same manner as in Example 1, except that the protective layer was not formed.

The adhesive sheets of Examples 1 to 10 and Comparative Example 1 were evaluated according to the following methods. The results are shown in Tables 2 to 5.

[Thickness of Protective Layer]

The thickness of the protective layer of the adhesive sheet before foaming was determined by subtracting the thickness of the adhesive sheet without the protective layer from the thickness of the adhesive sheet with the protective layer. Each thickness was measured by a thickness gauge test method according to JIS Z 0237 "Testing methods of pressure-sensitive adhesive tapes and sheets".

[Tackiness]

For the tackiness, the thumb was pressed against the sheet surface with a small force, and the presence or absence of stickiness when peeled off in a very short time was sensuously tested to determine the presence or absence of stickiness.

[Foreign Matter Adherence]

In an atmosphere of 40° C., 0.1 g of 20-30 mesh sea sand manufactured by Wako Pure Chemical Industries, Ltd. was sprinkled on the sheet surface, then, the sheet was turned 180° so that the side on which the sea sand was sprinkled faced downward. Thereafter, the surface of the sheet was visually observed and evaluated according to the following criteria.

"A": No sea sand attached at all.

"B": 4 or less sea sands attached.

"C": 5 or more sea sands attached.

[Adhesiveness]

Figure 2:
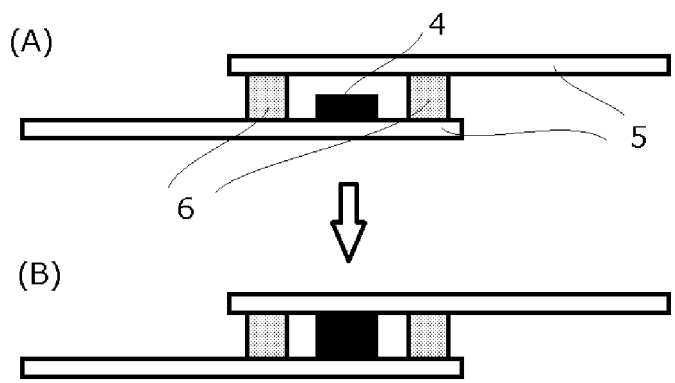
FIG. 2 is a schematic view for explaining a method for testing the shear adhesive force of an example.

According to the tensile shear adhesive force test method described in JIS Z1541 "High potential pressure sensitive adhesive double coated tapes", the shear adhesive force of the adhesive sheet after foaming as shown in FIG. 2 was measured. An SPCC plate (manufactured by Nissin Steel Co., Ltd., trade name: SPCCSB NCB, 1.0 mm thick, 12×100 mm) was used as an adherend. The sample attachment area was 10×10 mm, the foaming and curing conditions were 10 minutes at 180° C., and the tensile speed was 200 mm/min.

First, as shown in FIG. 2(A), the adhesive sheet 4 before foaming was placed on the SPCC plate 5, and further, another SPCC plate 5 was placed via two metal interspace gauges (0.300 mm) 6. Next, as shown in FIG. 2(B), the adhesive sheet 4 was foamed and cured, and a tensile shear adhesive force test (23° C.) was performed on the adhesive sheet 4 after foaming.

[Surface Resistance]

The surface resistance (Ω) of the adhesive sheet before foaming was measured according to JIS K6911 "Testing methods for thermosetting plastics".

[Visual Discrimination]

The front and back of the adhesive sheet before foaming were visually observed and evaluated according to the following criteria.

"A": the front and back could be discriminated
"B": the front and back could not be discriminated

[Pencil Hardness]

The pencil hardness of the adhesive sheet before foaming was measured according to JIS K5600 "Testing methods for paints".

[Contact Angle]

The contact angle of the adhesive sheet before foaming was measured according to JIS R3257 "Testing method of wettability of glass substrate". For the contact angle of water, industrial purified water A300 manufactured by AS ONE Corporation was used, and for the contact angle of an oil, TOYOTA genuine Auto Fluid WS (ATF) was used.

[Contamination Resistant Adhesiveness]

The shear adhesive force of an adhesive sheet before foaming contaminated with ATF was measured by the same procedure as the method for evaluating the adhesiveness, and the percentage of the shear adhesive force of the contaminated adhesive sheet was calculated when the shear adhesive force of a non-contaminated sheet was taken as 100%. The contaminated adhesive sheet was obtained by immersing an adhesive sheet in ATF for 1 second, sandwiching the sheet with a dry waste paper, and allowing the waste paper to absorb excess ATF on the surface of the sheet.

[Solvent Resistance]

The surface of a sheet was rubbed three times in reciprocation with absorbent cotton impregnated with toluene at a pressure of 0.1 MPa, and the solvent resistance was evaluated according to the following criteria.

"A": No surface roughness was visually recognized at all.
"B": Whitened but not eluted.
"C": The adhesive layer was eluted into the absorbent cotton.

[Thermal Conductivity]

The thermal conductivity of an adhesive sheet after foaming was measured using a quick thermal conductivity meter manufactured by Kyoto Electronics Manufacturing Co., Ltd. at thin film measurement mode. Specifically, three kinds of reference blocks having known thermal conductivity were placed on an aluminum plate (10 mm thick, 250×350 mm), and a test piece for measurement (45×100 mm) was placed thereon, and further, a sensor probe (trade name PD-11, 40×97 mm, 820 g) for measuring thermal conductivity equipped with heater wire and a thermocouple was placed thereon, and measurement was started. As the reference block, foamed polyethylene (thermal conductivity 0.0347 W/mK), silicone rubber (thermal conductivity 0.236 W/mK) and quartz glass (thermal conductivity 1.416) were used.

[Static Friction Coefficient]

The static friction coefficient of an adhesive sheet before foaming was measured according to JIS K7125 "Plastics-Film and sheeting-Determination of the coefficients of friction".

[Flame Retardancy]

A test was performed on a sample obtained by subjecting an adhesive sheet having a sample size used in the UL94V test to foaming and curing in a thermostat, and the flame retardancy of the sample was evaluated according to the following criteria.

"A": The test passed the UL94V test under V0 test conditions.
"B": A part of the sample did not burn and remained after two flame contacts, with the flame contact time of the UL94V test being 2 seconds.
"C": All of the sample burned.

TABLE 2

| | | | Ex. 1 | Ex. 2 | Ex. 3 | Ex. 4 | Ex. 5 | Ex. 6 |
|---|---|---|---|---|---|---|---|---|
| Adhesive sheet | Protective layer | Kind | Antistatic | Coloring | HC, Printing | HC | Water oilrepellent | Solvent resistant |
| | | Compounding | 2 | 3 | 4/5 | 5 | 6 | 7 |
| | | Thickness (μm) | 3 | 10 | 10 | 10 | <1 | 10 |
| | Expandable adhesive layer (μm) | | 50 | 50 | 50 | 50 | 50 | 50 |
| | Base (μm) | | 75 | 75 | 75 | 75 | 75 | 75 |
| | Expandable adhesive layer (μm) | | 50 | 50 | 50 | 50 | 50 | 50 |
| Tackiness | | | None | None | None | None | None | None |
| Foreign matter adherence | | | A | A | A | A | A | A |
| Adhesiveness (after foaming) (N/cm$^2$) | | | 408 | 308 | 299 | 322 | 113 | 195 |
| Function evaluation | Surface resistance (×10$^{12}$Ω) | | 0.1 | — | — | — | — | — |
| | Visual discrimination | | — | A | A | — | — | — |
| | Pencil hardness | | — | — | — | B | — | — |
| | Contact angle | Water | — | — | — | — | 112° | — |
| | | Oil | — | — | — | — | 77° | — |
| | Contamination resistant adhesiveness | | — | — | — | — | 82% | — |
| | Solvent resistance | | — | — | — | — | — | A |

TABLE 3

|  |  |  | Ex. 7 | Ex. 8 | Ex. 9 | Ex. 10 |
|---|---|---|---|---|---|---|
| Adhesive sheet | Protective layer | Kind | Heat dissipation | Lubrication | Flame retardancy | Flame retardancy |
|  |  | Compounding | 8 | 9 | 10 | 10 |
|  |  | Thickness (μm) | 15 | <1 | 13 | 7 |
|  | Expandable adhesive layer (μm) |  | 50 | 50 | 50 | 50 |
|  | Base (μm) |  | 75 | 75 | 75 | 75 |
|  | Expandable adhesive layer (μm) |  | 50 | 50 | 50 | 50 |
| Tackiness |  |  | None | None | None | None |
| Foreign matter adherence |  |  | A | A | A | A |
| Adhesiveness (after foaming) (N/cm$^2$) |  |  | 226 | 551 | 326 | 369 |
| Function evaluation | Thermal conductivity (W/mK) |  | 0.157 | — | — | — |
|  | Static friction coefficient |  | — | 0.35 | — | — |
|  | Flame retardancy |  | — | — | A | B |

TABLE 4

|  |  |  | Comparative. Ex. 1 |
|---|---|---|---|
| Adhesive sheet | Protective layer | Kind | — |
|  |  | Compounding | — |
|  |  | Thickness (μm) | 0 |
|  | Expandable adhesive layer (μm) |  | 50 |
|  | Base (μm) |  | 75 |
|  | Expandable adhesive layer (μm) |  | 50 |
| Tackiness |  |  | positive |
| Foreign matter adherence |  |  | C |
| Adhesiveness (after foaming) (N/cm$^2$) |  |  | 579 |
| Function evaluation | Surface resistance (×10$^{12}$Ω) |  | 37.8 |
|  | Visual discrimination |  | C |
|  | Pencil hardness |  | 3B |
|  | Contact angle | Water | 72° |
|  |  | Oil | 27° |
|  | Contamination resistant adhesiveness |  | 55% |
|  | Solvent resistance |  | C |
|  | Thermal conductivity (W/mK) |  | 0.119 |
|  | Static friction coefficient |  | Unmeasurable due to tackiness |
|  | Flame retardancy |  | C |

[IR Measurement]

Figure 3:
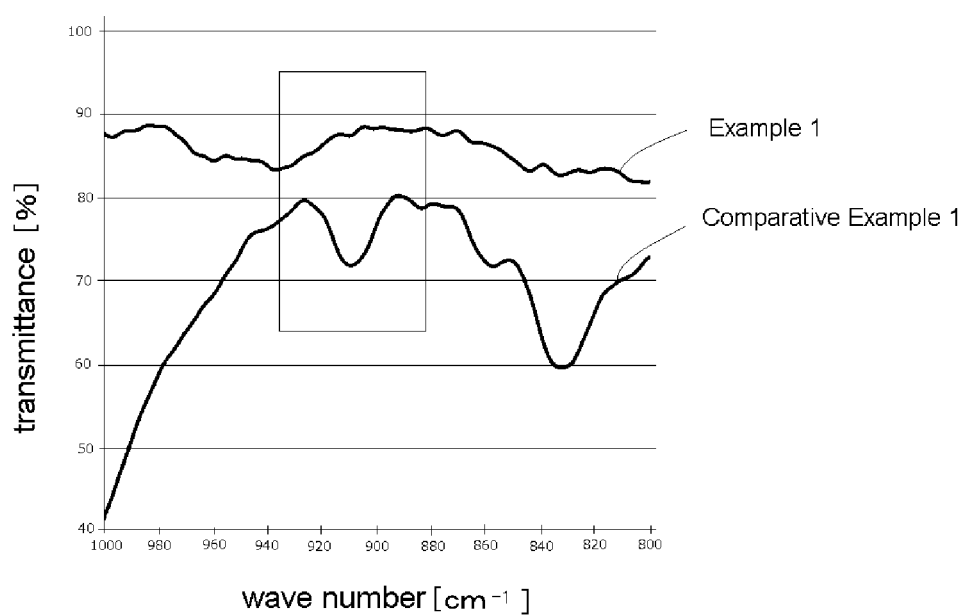
FIG. 3 is a graph showing the results of reflection IR measurement of the surface compositions of the protective layer (before foaming) of the adhesive sheet of Example 6 and the adhesive layer (before foaming) of the adhesive sheet of Comparative Example 1.

Reflection IR measurement was performed on the surface composition of the protective layer (before foaming) of the adhesive sheet of Example 6 and the adhesive layer (before foaming) of the adhesive sheet of Comparative Example 1. FIG. 3 is a graph showing the result. As apparent from this result, an epoxy-derived absorption peak exists on the surface of the adhesive layer of the adhesive sheet of Comparative Example 1, but no peak exists on the surface of the protective layer of the adhesive sheet of Example 6. Therefore, the adhesive sheet of Example 6 does not cause skin damage due to the epoxy resin component.

INDUSTRIAL APPLICABILITY

The adhesive sheet of the present invention can protect the adhesive surface and does not cause blocking or skin damage even without using a release liner. Moreover, various functions can be given to the adhesive sheet without impairing the properties of the adhesive layer. Therefore, it is useful for various uses in a wide range of fields such as the electric and electronic fields, the automobile-related fields, and the civil engineering and construction fields.

EXPLANATION OF NUMERALS

1: base
2: adhesive layer
3: protective layer
3a: protective layer
3b: protective layer
4: adhesive sheet
5: SPCC plate
6: metal interspace gauge

The invention claimed is:

1. An adhesive sheet comprising an adhesive layer provided on at least a part of one side or both sides of a base, wherein
    the adhesive layer is a foamable epoxy adhesive layer containing a polyfunctional epoxy resin and an epoxy resin other than the polyfunctional epoxy resin, and
    a hot-melt protective layer is provided on at least a part of a surface of the adhesive layer away from the base, and the protective layer contains a hard coating agent.

2. The adhesive sheet according to claim 1, wherein the thickness of the adhesive layer is 2 to 300 μm.

3. The adhesive sheet according to claim 1, wherein a print layer is formed on the protective layer.

4. The adhesive sheet according to claim 1, wherein the adhesive layer further contains a linear polyester type polyurethane resin.

5. The adhesive sheet according to claim 1, wherein the adhesive layer contains 20 parts by mass or more of a liquid epoxy resin which is the epoxy resin other than the polyfunctional epoxy resin, per 100 parts by mass of epoxy resin components in the adhesive layer.

\* \* \* \* \*